US006025590A

United States Patent [19]

Itoi

[11] Patent Number: 6,025,590

[45] Date of Patent: Feb. 15, 2000

[54] ION DETECTOR

[75] Inventor: Hiroto Itoi, Kyoto, Japan

[73] Assignee: Shimadzu Corporation, Kyoto, Japan

[21] Appl. No.: 08/978,273

[22] Filed: Nov. 25, 1997

[30] Foreign Application Priority Data

Dec. 26, 1996 [JP] Japan .................................... 8-359024

[51] Int. Cl.[7] ............................. B01D 59/44; H01J 49/00

[52] U.S. Cl. ............................................. 250/281; 250/283

[58] Field of Search ..................................... 250/281, 283, 250/292

[56] References Cited

U.S. PATENT DOCUMENTS

| | | | |
|---|---|---|---|
| 4,223,223 | 9/1980 | Hofer et al. | 250/292 |
| 5,481,108 | 1/1996 | Yano et al. | 250/283 |
| 5,773,822 | 6/1998 | Kitamura et al. | 250/283 |

*Primary Examiner*—Bruce C. Anderson
*Attorney, Agent, or Firm*—Armstrong, Westerman, Hattori, McLeland & Naughton

[57] ABSTRACT

In an inventive ion detector, a cylindrical conversion electrode and an electron multiplier are disposed on a vertical axis intersecting an incidence axis of an ion beam at a right angle. The space between the conversion electrode and the electron multiplier is enveloped by a shield electrode having a cylindrical body with its central axis on the vertical axis. By such a configuration, the electric field which is symmetrical with respect to the vertical axis is generated in the above space, so that secondary electrons or positive ions emitted from the conversion electrode as a result of a secondary emission, travel toward the electron multiplier, converging in proximity to the vertical axis. Thus, most of the secondary electrons or positive ions are led to the electron multiplier with its entrance placed on the vertical axis.

18 Claims, 4 Drawing Sheets

ION DETECTOR

The present invention relates to an ion detector used in an analysis system such as mass spectrometer, and particularly to the ion detector that can detect ions with high accuracy and that can detect positive and negative ions selectively.

BACKGROUND OF THE INVENTION

In a conventional mass spectrometer, molecules of a gasified sample are ionized in an ionization chamber, and ions produced there are separated by a mass filter with respect to mass numbers (i.e. ratio of mass (m) to charge (z), m/z). Then, some of the ions pass through the mass filter and enter an ion detector, which generates an electric signal having an intensity corresponding to the number of the ions that has entered. Thus, the intensity of the distribution of the detection signals with respect to mass numbers is obtained.

FIG. 6 shows a configuration of a conventional high accuracy ion detector, coupled with a quadrupole mass filter for separating ions. In the ion detector, an aperture electrode 31 having an opening for letting ions through is disposed at the exit of the quadrupole unit 30 including four rod electrodes. A plate-shaped conversion electrode 32 and an electron multiplier 33 are disposed above and below an incidence axis C of a beam of ions, respectively, opposing to each other across the axis C. The aperture electrode 31 is grounded or an appropriate voltage V*a* is applied thereto. The conversion electrode 32 has a negative high voltage applied when positive ions are to be detected, or a positive high voltage when negative ions are to be detected.

When, for example, positive ions are to be detected using the above ion detector, the operation is carried out as follows. Ions that have passed through the space defined by the four rod electrodes of the quadrupole unit 30 (only two of them are shown in FIG. 6) along the longitudinal axis C, are converged and pass through the opening of the aperture electrode 31. After that, being attracted by the conversion electrode 32 to which a negative high voltage is applied, the ions travel on upward trajectories and collide on the conversion electrode 32. On the collision of the ions, secondary electrons are emitted from the conversion electrode 32. The secondary electrons travel downward and are captured by the electron multiplier 33. In the electron multiplier 33, the number of the electrons is increased by a repetition of secondary emissions, and a greater number of electrons reach an anode terminal 33*a*, which is taken out as an electric signal.

When ions having various mass numbers enter the space in the quadrupole unit 30 along the longitudinal axis while a voltage composed of a DC voltage and an AC voltage superposed thereon is applied to the rod electrodes of the quadrupole unit 30, only those ions having a particular mass number corresponding to the voltage is selectively allowed to pass through the space and other ions are diverged. Besides such selected ions, some neutral particles having high energies and other particles also pass through the space in the quadrupole unit 30. These undesired particles may cause a noise in the detection signal if they are captured by the electron multiplier 33. In the above ion detector, however, the neutral particles travel along a straight path in the electric field generated between the conversion electrode 32 and the electron multiplier 33. Thus, noises caused by undesired particles are eliminated and the desired ions can be detected with high accuracy.

In the ion detector, however, the electric field generated between the conversion electrode 32 and the electron multiplier 33 is influenced by the other charged bodies including the aperture electrode 31, so that the distribution of the strength of the electric field is asymmetrical around the central axis extending from the conversion electrode 32 to the electron multiplier 33. Therefore, part of secondary electrons emitted from the conversion electrode 32 fail to travel toward the electron multiplier 33, resulting in a smaller number of electrons to be detected by the electron multiplier 33 and thus deteriorate the efficiency of ion detection.

Furthermore, because of the above-described asymmetry in the electric field, the probability of a secondary electron's reaching the electron multiplier 33 depends on the point where the electron is emitted on the conversion electrode 32. This means that the probability of an ion's being detected depends on the position where the ion passes through the opening of the aperture electrode 31. Accordingly, even when ions of the same mass number pass through the aperture electrode 31 by the same amount, the result of detection may differ depending on the position where the ions pass through the opening of the aperture electrode 31. Because of such an irregularity in the ion detection, the reliability of the mass spectrometer using the above ion detector cannot be very high.

SUMMARY OF THE INVENTION

In view of the above problems, the present invention proposes an ion detector with which ions can be detected so efficiently that the reliability and sensitivity of mass spectrometry can be enhanced.

Thus, an ion detector according to the present invention includes:

a) a conversion electrode disposed on a second axis intersecting substantially perpendicular to an incidence axis of object ions and displaced from the incidence axis, the conversion electrode having a voltage applied of opposite polarity to that of the object ions for emitting secondary electrons or positive ions through collisions with the object ions;

b) a detection unit disposed on the second axis in opposition to the conversion electrode across the incidence axis, the detection unit detecting the secondary ions or the positive ions; and c) a shield electrode having a substantially cylindrical body with an axis of the cylindrical body on the second axis, the shield electrode enveloping a space between the conversion electrode and the detection unit with an entrance for the object ions in a side face at the incidence axis.

The inventive ion detector is used to detect object ions passing through a quadrupole mass filter, for example. In this case, the ions exiting from the mass filter travel along the incidence axis and enter the shield electrode through the entrance opening. To the conversion electrode is applied a high voltage with its polarity opposite to that of the object ions. For example, when positive ions are to be detected, a negative high voltage is applied to the conversion electrode, so that the positive ions are attracted by the conversion electrode and collide on the collision surface of the conversion electrode, whereby secondary electrons are displaced through impact. Since the shield electrode shields the inner space from the outside electric field, the distribution of the strength of the inner electric field is almost symmetrical around the second axis. Therefore, while traveling from the conversion electrode toward the detection unit, the secondary electrons experience a force that converges the electrons in proximity to the second axis. Thus, most of the electrons are captured by the detection unit. The detection unit measures the amount of the electrons, which corresponds to the amount of the positive ions.

When negative ions are to be detected, a positive high voltage is applied to the conversion electrode, so that the negative ions are attracted by the conversion electrode and collide on the collision surface, where the negative ions are converted into positive ions. While traveling from the conversion electrode toward the detection unit, the positive ions experience a force that converges the positive ions in proximity to the second axis. Thus, most of the positive ions are captured by the detection unit. The detection unit measures the amount of the positive ions, which corresponds to the amount of the negative ions.

For the purpose of generating such an electric field so that more secondary electrons or positive ions converge in proximity to the second axis while traveling in the shield electrode, it is recommendable to shape the conversion electrode into a cylinder with its central axis on the second axis, whereby the distance between the inner wall of the shield electrode and the outer wall of the conversion electrode is equal anywhere. It is further preferable to shape the collision surface of the conversion electrode into a concave surface.

Thus, the ion detector according to the present invention provides an improved efficiency of capturing secondary electrons or positive ions emitted from the conversion electrode by the detection unit, i.e. an improved efficiency of detecting object ions, so that the sensitivity of mass spectrometry is improved. Furthermore, secondary electrons or positive ions emitted from the conversion electrode are converged and led to the detection unit assuredly, irrespective of the point of emission, so that the irregularity in the ion detection is eliminated and the reliability of mass spectrometry is enhanced accordingly.

BRIEF DESCRIPTION OF THE DRAWING

Preferred embodiments of the present invention will be detailed later referring to the attached drawing wherein.

DETAILED DESCRIPTION OF PREFERRED EMBODIMENTS

Figure 1:
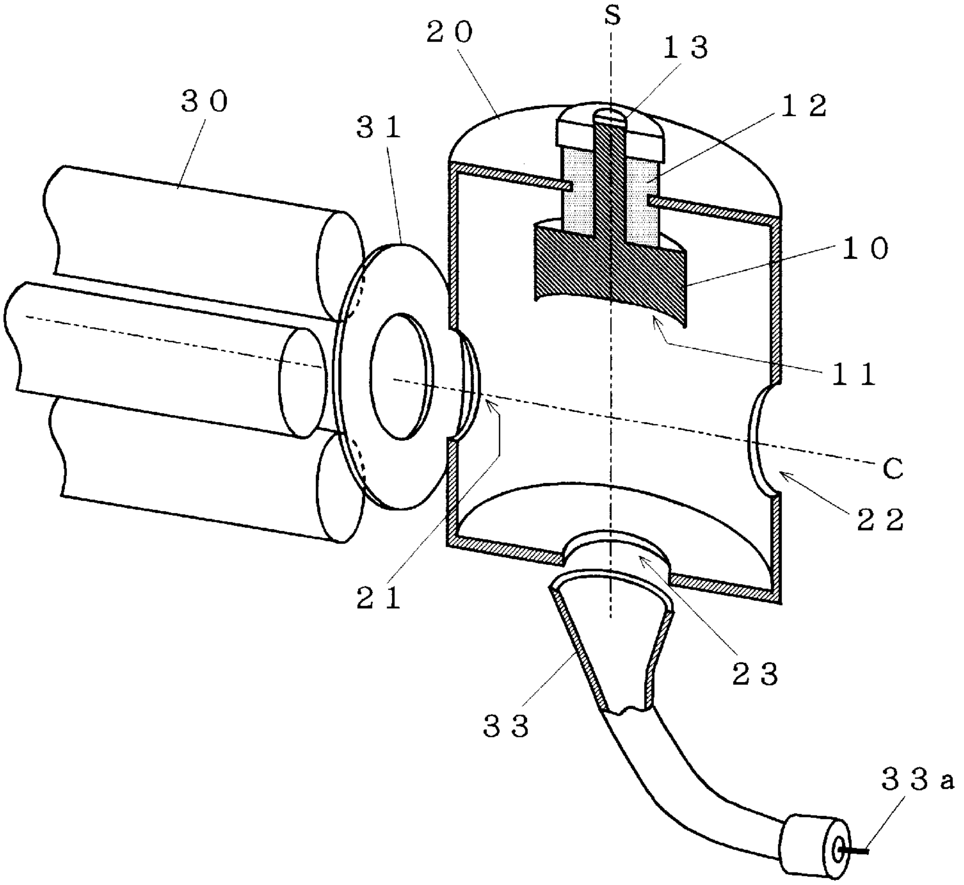
FIG. 1 is a perspective view showing the configuration of an ion detector according to the present invention, part of which is drawn as a sectional view.

FIG. 1 shows a configuration of an ion detector which is an embodiment of the present invention, main part of which is drawn as a vertical section. The ion detector includes a conversion electrode 10, a shield electrode 20 enveloping the conversion electrode 10 and an electron multiplier 33 disposed outside of the shield electrode 20. The shield electrode 20 has a cylindrical body with its central axis on an axis S, which intersects a central axis C of a quadrupole unit 30 along which an ion beam passes. The shield electrode 20 has an entrance opening 21 and an exit opening 22, each opening provided in the side wall of the shield electrode 20 in a position where the axis C penetrates the wall. The conversion electrode 10 is cylindrical with its central axis on the axis S, where the collision surface 11 for receiving ions are formed into a smooth concave surface. The conversion electrode 10 is fixed to an end of the shield electrode 20 via a ceramic insulator 12, and a lead 13 for applying voltage to the conversion electrode 10 is taken out through the shield electrode 20. At the other end of the shield electrode 20 is provided a detection opening 23 with its center on the axis S, and the electron multiplier 33 is disposed so that its entrance comes just under the detection opening 23.

Figure 2:
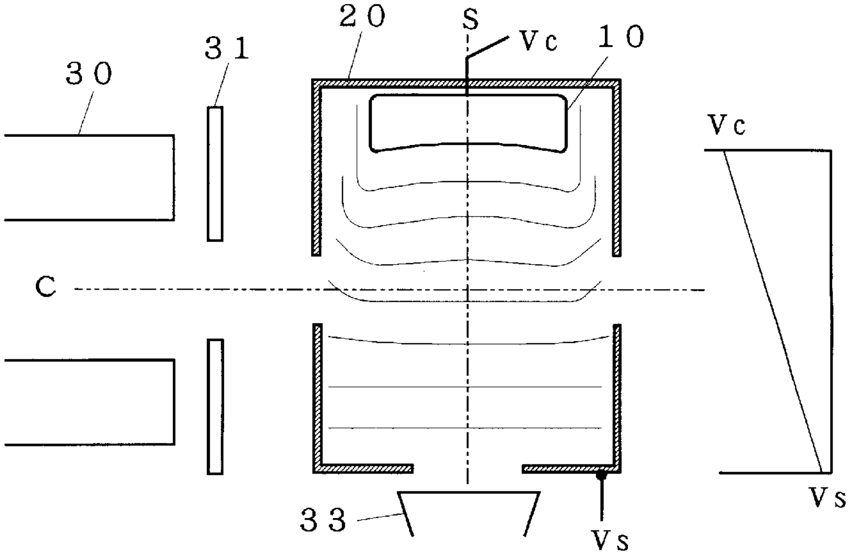
FIG. 2 is an illustration showing the state of the electric field in the shield electrode of the inventive ion detector.

In the above ion detector, a negative high voltage is applied to the conversion electrode 10 via the lead 13 when positive ions are to be detected, whereas a positive high voltage is applied to the conversion electrode 10 via the lead 13 when negative ions are to be detected. The voltage of the shield electrode 20 is maintained at a constant value by grounding it or by applying a constant voltage to it. FIG. 2 illustrates equipotential surfaces in the shield electrode 20 and a potential gradient on the axis S, where the voltage applied to the conversion electrode 10 is Vc and the voltage applied to the shield electrode 20 is Vs. FIG. 2 shows that, in the electric field generated in the shield electrode 20, the potential distribution is such that each equipotential surface has a shape of a substantial circular plane with its center on the axis S and the potential gradually declines from the conversion electrode 10 toward the electron multiplier 33.

Figure 3A:
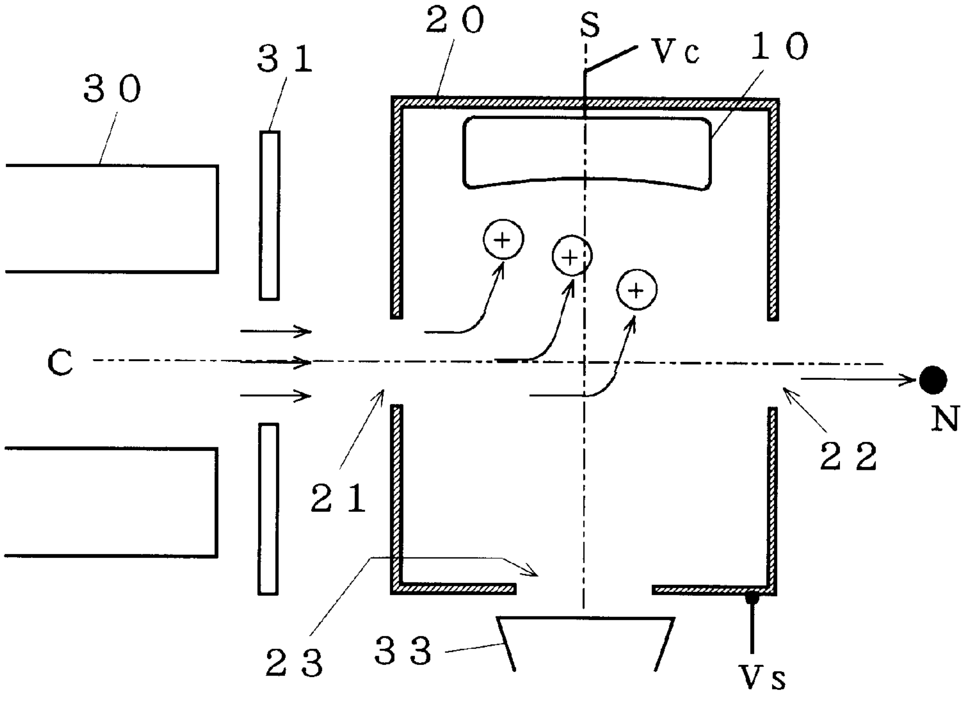
FIGS. 3A and 3B show an operation of detecting positive ions by the inventive ion detector.

When the above ion detector is used to detect positive ions, the ion detector operates as follows. Referring to FIG. 3A, a high voltage Vc, which is negative with respect to the voltage of the shield electrode 20, is applied to the conversion electrode 10. Ions that have passed through the space in the quadrupole unit 30 along the axis C are converged by the aperture electrode 31 and enter the shield electrode 20 through the entrance opening 21. High energy particles, N, which also enter the shield electrode 20 together with the ions, travel along a straight path without being influenced by the electric field in the shield electrode 20 and exit from the exit opening 22. Thus, high energy particles which may cause a noise are removed.

The positive ions that have entered the shield electrode 20 travel in the electric field having a potential distribution as described above. In the electric field, the ions experience an upward force, travel upward and collide on the collision surface 11 of the conversion electrode 10 (see FIG. 3A), whereby secondary electrons are impacted out of the conversion electrode 10. Then, the secondary electrons travel toward the detection opening 23 where the potential is highest, each electron drawing a trajectory that penetrates the equipotential surfaces (shown in FIG. 2) at right angles. Therefore, while traveling downward, all the secondary electrons emitted from various parts of the collision surface 11 gradually approach the axis S and converged in proximity to the axis S. The converged secondary electrons exit the shield electrode 20 through the detection opening 23 and enter the electron multiplier 33. In the electron multiplier 33, the number of electrons is increased greatly by a repetition of secondary emissions. The number of electrons generated in the last secondary emission corresponds to the number of the secondary electrons entering the electron multiplier 33 initially. The resultant electrons are taken out from the anode terminal 33*a* as an electric signal, and the strength of the signal is measured by an ampere meter (not shown).

Figure 3B:
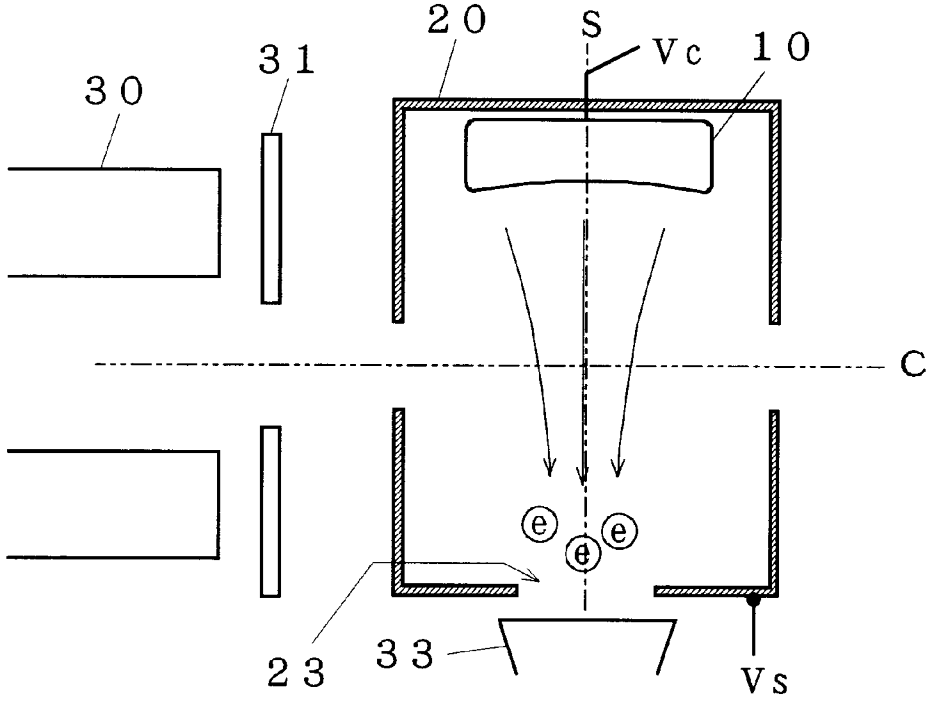

Referring to FIG. 3B, when the above ion detector is used to detect negative ions, a high voltage Vc, which is positive with respect to the shield electrode 20, is applied to the conversion electrode 10. In this case, when negative ions collide on the conversion electrode 10, the negative ions are converted into positive ions. The positive ions travel downward, drawing trajectories similar to the trajectories of the above-described secondary electrons, and arrive at the electron multiplier 33.

Figure 4A:
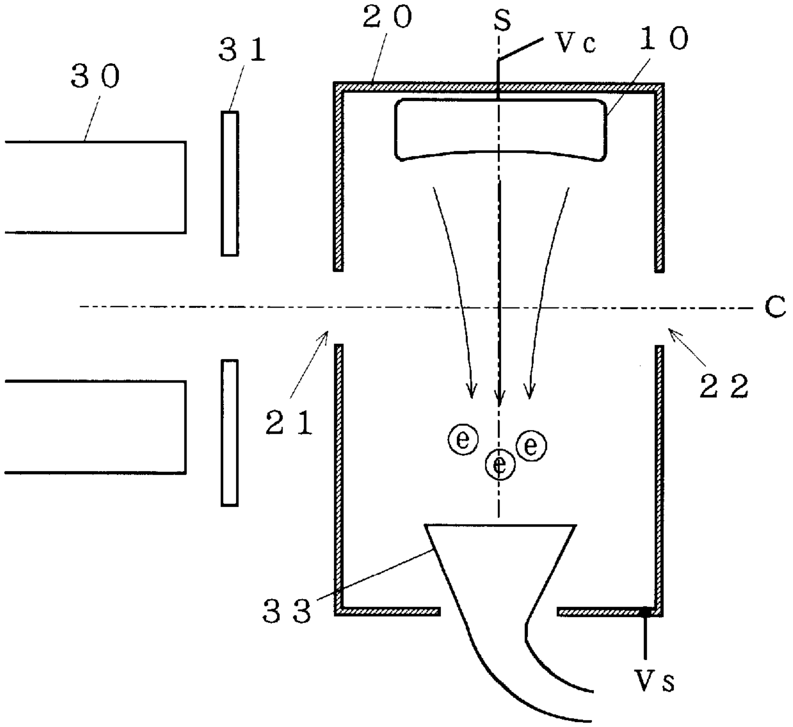
FIGS. 4A and 4B show modifications of the ion detector of FIG. 1.
Figure 4B:
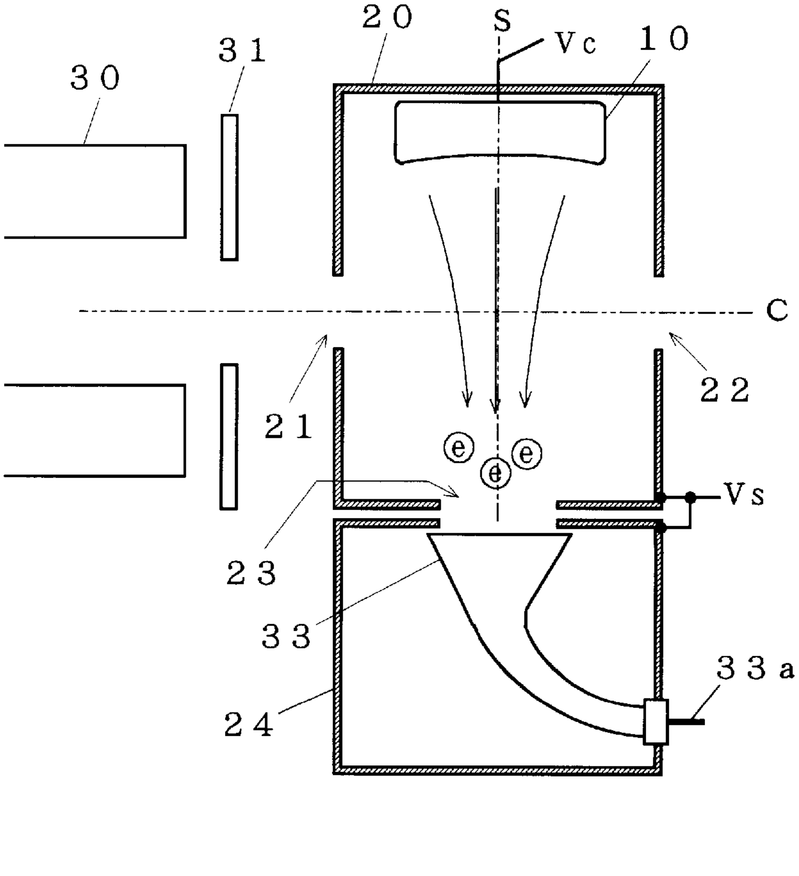

In the above ion detector, the electron multiplier 33 may be disposed in the shield electrode 20 as shown in FIG. 4A. The electron multiplier 33 may be otherwise enveloped by another shield electrode. FIG. 4B shows an ion detector of this type, wherein the electron multiplier 33 is enveloped by a second shield electrode 24, whereby the effect of reducing noise is expected to be higher.

Figure 5:
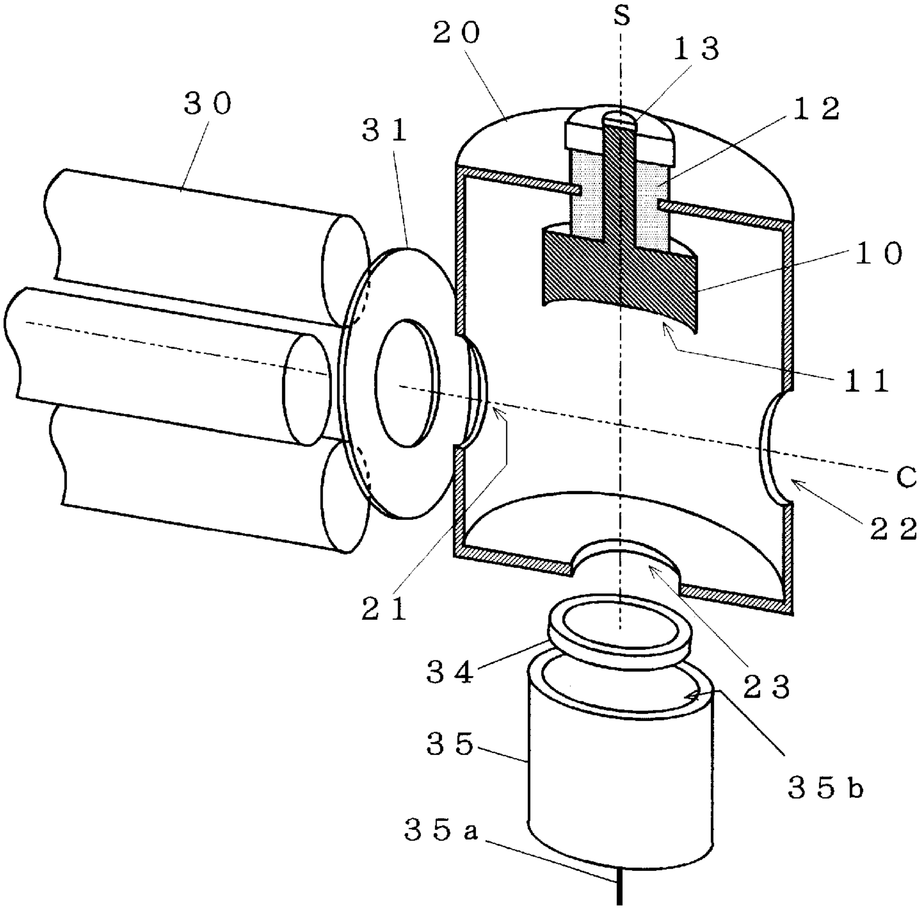
FIG. 5 is a perspective view showing the configuration of another modification of the ion detector of FIG. 1.
Figure 6:
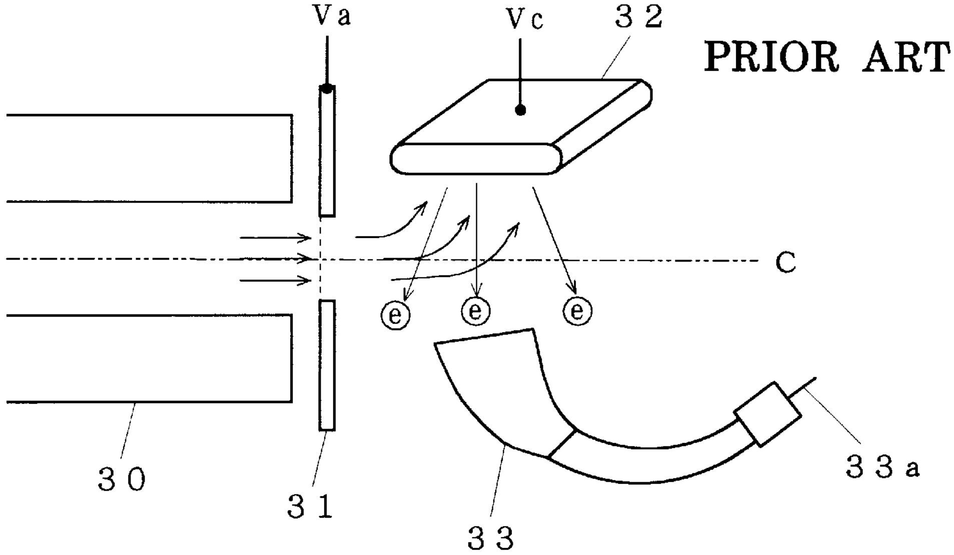
FIG. 6 shows a configuration of a conventional ion detector.

FIG. 5 shows another ion detector which is a modification of the ion detector of FIG. 1. The ion detector of FIG. 5 includes a scintillator 34 disposed under the detection opening 23 of the shield electrode 20 and a photo-detector 35 disposed under the scintillator 34, in place of the electron multiplier 33. In this ion detector, when secondary electrons or positive ions coming from the detection opening 23 collide on the scintillator 34, the scintillator 34 emits photons, part of which are received by a receiving surface 35*b* of the photo-detector 35. There, the photons are converted into secondary electrons, which are amplified in the photo-detector 35 by a repetition of secondary emissions. Thus, a greater number of electrons are taken out from an anode terminal 35*a* as an electric signal whose intensity corresponds to the number of the electrons or positive ions received by the scintillator 34.

In a conventional ion detector using a flat plate conversion electrode, it is necessary to chamfer the edge to avoid discharge therefrom when a high voltage is applied. In producing the conventional conversion electrode, therefore, extra work is required for chamfering the sharp edge, such as machining or buffing. As for the conversion electrode used in the inventive ion detector, on the other hand, the edge chamfering can be carried out when machining out the cylindrical conversion electrode with the concave surface as a collision surface. Thus, time and labor consumed for the production of electrodes can be reduced by using a conversion electrode as described above.

What is claimed is:

1. An ion detector comprising:

a) a conversion electrode disposed on a second axis intersecting substantially perpendicular to an incidence axis of object ions and displaced from the incidence axis, the conversion electrode having a voltage applied of opposite polarity to that of the object ions for emitting secondary electrons or positive ions through collisions with the object ions;

b) a detection unit disposed on the second axis in opposition to the conversion electrode across the incidence axis, the detection unit detecting the secondary ions or the positive ions; and c) a shield electrode having a substantially cylindrical body with an axis of the cylindrical body on the second axis, where:

the shield electrode comprises a sidewall enveloping a space between the conversion electrode and the detection unit and a bottom wall provided at a side where the detection unit is disposed;

the side wall is provided with an entrance opening at the incidence axis for introducing the object ions into the shield electrode; and the bottom wall is provided with an exit opening for introducing said secondary electrons or positive ions into the detection unit.

2. The ion detector according to claim 1, characterized in that the conversion electrode is cylindrical, and is disposed so that a central axis thereof coincides with the axis of the shield electrode.

3. The ion detector according to claim 2, characterized in that a collision surface of the conversion electrode is shaped into a concave surface.

4. The ion detector according to claim 3, characterized in that the detection unit is disposed in the shield electrode.

5. The ion detector according to claim 4, characterized in that the detection unit comprises a scintillator for receiving the secondary electrons or the positive ions and a photo-detector for detecting photons emitted by the scintillator.

6. The ion detector according to claim 3, characterized in that the detection unit is enveloped by another shield electrode.

7. The ion detector according to claim 6, characterized in that the detection unit comprises a scintillator for receiving the secondary electrons or the positive ions and a photo-detector for detecting photons emitted by the scintillator.

8. The ion detector according to claim 3, characterized in that the detection unit comprises a scintillator for receiving the secondary electrons or the positive ions and a photo-detector for detecting photons emitted by the scintillator.

9. The ion detector according to claim 2, characterized in that the detection unit is disposed in the shield electrode.

10. The ion detector according to claim 9, characterized in that the detection unit comprises a scintillator for receiving the secondary electrons or the positive ions and a photo-detector for detecting photons emitted by the scintillator.

11. The ion detector according to claim 2, characterized in that the detection unit is enveloped by another shield electrode.

12. The ion detector according to claim 11, characterized in that the detection unit comprises a scintillator for receiving the secondary electrons or the positive ions and a photo-detector for detecting photons emitted by the scintillator.

13. The ion detector according to claim 2, characterized in that the detection unit comprises a scintillator for receiving the secondary electrons or the positive ions and a photo-detector for detecting photons emitted by the scintillator.

14. The ion detector according to claim 1, characterized in that the detection unit is disposed in the shield electrode.

15. The ion detector according to claim 14, characterized in that the detection unit comprises a scintillator for receiving the secondary electrons or the positive ions and a photo-detector for detecting photons emitted by the scintillator.

16. The ion detector according to claim 1, characterized in that the detection unit is enveloped by another shield electrode.

17. The ion detector according to claim 16, characterized in that the detection unit comprises a scintillator for receiving the secondary electrons or the positive ions and a photo-detector for detecting photons emitted by the scintillator.

18. The ion detector according to claim 1, characterized in that the detection unit comprises a scintillator for receiving the secondary electrons or the positive ions and a photo-detector for detecting photons emitted by the scintillator.

* * * * *